J. KENNEDY.
ADJUSTABLE SUSPENSION BRACKET.
APPLICATION FILED JUNE 1, 1912.
1,045,153.
Patented Nov. 26, 1912.
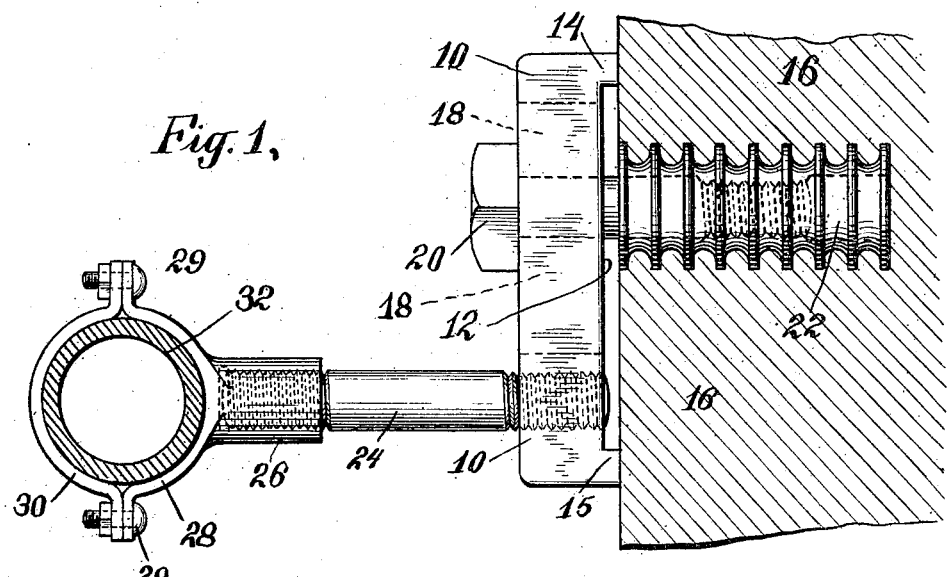
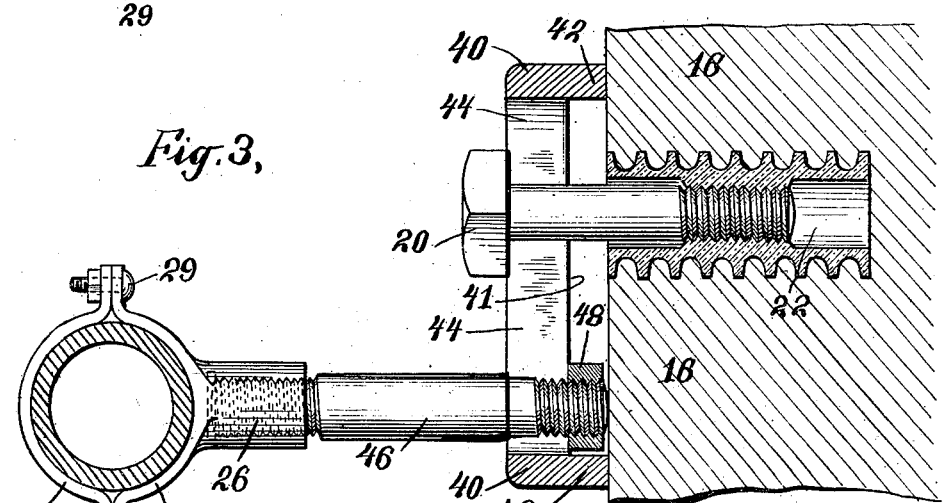
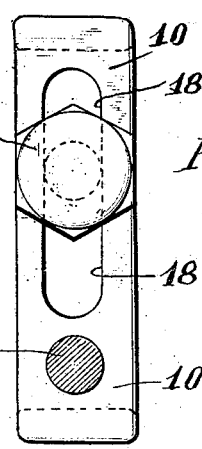
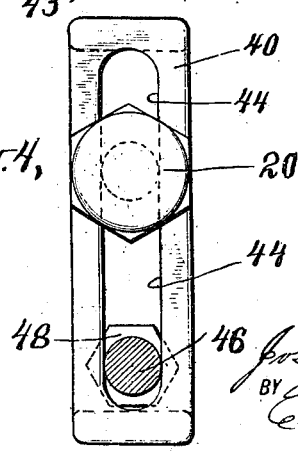
WITNESSES
F. Graves.
G. Quimby
INVENTOR
Joseph Kennedy
BY E. W. Marshall
ATTORNEY

UNITED STATES PATENT OFFICE.

JOSEPH KENNEDY, OF NEW YORK, N. Y.

ADJUSTABLE SUSPENSION-BRACKET.

1,045,153.

Specification of Letters Patent.

Patented Nov. 26, 1912.

Application filed June 1, 1912. Serial No. 701,107.

*To all whom it may concern:*

Be it known that I, JOSEPH KENNEDY, a citizen of the United States, and a resident of the city, county, and State of New York, have invented certain new and useful Improvements in Adjustable Suspension-Brackets, of which the following is a specification, reference being had to the accompanying drawings, forming a part thereof.

This invention relates to an improvement in adjustable suspension brackets for suspending material from ceilings or walls.

The object of the invention is to provide a simple inexpensive bracket, which is readily adjustable and which has advantages over those heretofore constructed.

I will describe my invention in the following specification and point out the novel features thereof in the appended claims.

In the accompanying drawing Figure 1 is a sectional side elevation of one form of the invention as applied to a wall for supporting pipes. Fig. 2 is a front elevation of the same. Fig. 3 is a view similar to Fig. 1 of a modified form of the invention. Fig. 4 is a front elevation of the same.

As illustrated in Figs. 1 and 2 one embodiment of the invention comprises a plate or bar 10 recessed at 12 and provided with lugs 14, 15 which are adapted to bear against the wall or ceiling 16 upon which the bracket is mounted. The plate 10 is provided with an elongated slot 18 through which a bolt 20 is adapted to pass, said bolt being threaded into a metal anchorage 22 secured within the wall 16 in any suitable manner. By this construction the bar 10 may be adjusted as desired within the limits of the slot 18 and then clamped in position by the bolt 20.

A stud 24 is threaded at one end into the bar 10 adjacent to one end of the slot 18, and the other end of the stud is threaded into a boss 26 of a yoke 28 forming one half of a pipe hanger. A strap 30 is secured at each end to the yoke 28 by screws 29 and coöperates therewith to hold a pipe 32 or other piece of material. Instead of the pipe hanger shown, the stud 24 may be affixed to any other suitable clamping member according to the material sought to be suspended from the wall or ceiling. It is also obvious that the plate 10 may be rotated about the bolt 20 to obtain the desired adjustment of position.

In the form shown in Figs. 3 and 4, a plate or bar 40 recessed at 41 is provided with lugs 42, 43 which are adapted to bear against the wall or ceiling 16. The plate 40 is provided with an elongated slot 44 through which the bolt 20 is adapted to pass, said bolt being threaded into an anchorage 22 as described above. The stud 46 passes through the slot 44 and is threaded into a nut 48 held in the recess 41, and the outer end of said stud is threaded into the hanger yoke 28 as described above. In this form of the device a single elongated slot receives the securing bolt and the stud for the hanger.

With this arrangement, pipes, shaft hangers and other devices may be affixed to a wall in which are suitable anchorages, and placed in desired positions to a nicety, without the necessity of accurately setting the positions of the anchorages. When the form of bracket shown in Figs. 3 and 4 is used, a headed bolt may be put through the slot with its head in the position of the nut 48 before the bracket is affixed to the wall, or a T-shaped head may be put through the slot from the outside.

What I claim is:

1. An adjustable suspension bracket comprising a bar substantially parallel with and spaced from the surface to which it is to be affixed, said bar having an elongated slot extending therethrough, a bolt extending through said slot and adapted to be secured in a wall or ceiling, to thereby hold said bar in a position adjustable radially and longitudinally in respect to said bar, a stud adjustably connected with said bar and a holding device on said stud.

2. An adjustable suspension bracket, comprising a bar having an elongated slot extending therethrough, lugs at either end of said slot adapted to rest upon the surface of the structure to which said bracket is to be affixed, said slot being adapted to receive a securing bolt, a stud threaded at one end into said bar to extend substantially at right angles from the wall or ceiling upon which the bar is secured, a yoke threaded upon the other end of said stud and a strap secured to said yoke.

3. An adjustable suspension bracket, comprising a nut adapted to be secured in the wall to which the bracket is attached, a bar spaced from the wall and having an elongated slot extending therefrom, a single bolt extending through the slot and threaded into the nut and a holding device adjustably secured to the bar.

4. An adjustable suspension bracket, comprising a nut adapted to be secured in the wall to which the bracket is to be attached, a bar having projections which rest against the wall and space it from the wall, and having an elongated slot extending through it, a single bolt extending through the slot and threaded into the nut in the wall, to thereby hold said bar in a position adjustable radially and longitudinally in respect to said bar, a stud adjustably connected with said bar and extending at substantially right angles therefrom, a yoke secured to the outer end of said stud and a strap secured to said yoke.

In witness whereof, I have hereunto set my hand this 28th day of May 1912.

JOSEPH KENNEDY. [L. S.]

Witnesses:
ELIZABETH ALEXANDER,
I. B. MOORE.